No. 851,402. PATENTED APR. 23, 1907.
S. COCHRANE.
DRY BATTERY.
APPLICATION FILED JAN. 19, 1906.
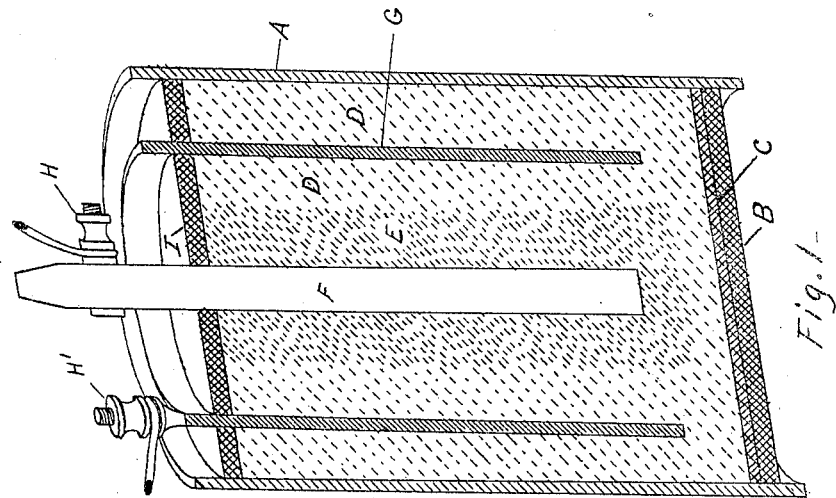
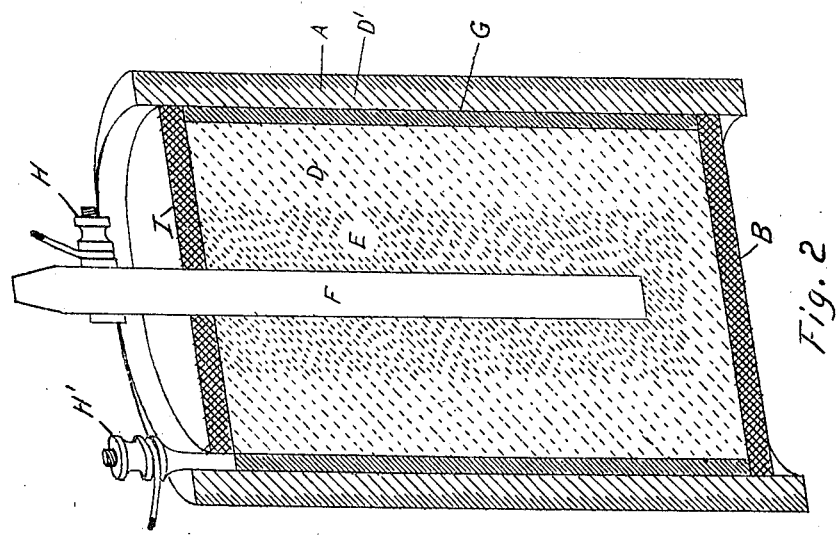

UNITED STATES PATENT OFFICE.

SAMUEL COCHRANE, OF JERSEY CITY, NEW JERSEY, ASSIGNOR TO LINCOLN ELECTRIC COMPANY, OF JERSEY CITY, NEW JERSEY, A CORPORATION OF NEW JERSEY.

DRY BATTERY.

No. 851,402.   Specification of Letters Patent.   Patented April 23, 1907.

Application filed January 19, 1906. Serial No. 296,763.

*To all whom it may concern:*

Be it known that I, SAMUEL COCHRANE, a citizen of the United States, residing at Jersey City, in the county of Hudson and State of New Jersey, have invented a new and useful Electrical Battery, of which the following is a specification.

My invention relates to improvements in that type of electrical batteries known as "dry" batteries, or cells in which the excitant or electrolyte is held by an absorbent material within the cell.

In the form of cell commonly used, the cell or cup is made of zinc and covered on the outside with paper; this paper being absorbent, a current of electricity is set up when the batteries or cells are in contact, and the cells thereby run down.

The object of my invention is to provide cells that are absolutely insulated, and which may, therefore, be placed in contact with each other—that is, packed in contact, without danger of deterioration; and for a full understanding thereof reference is to be had to the accompanying drawing forming a part of this specification, and in which Figures 1 and 2 represent vertical sections through the center of the cell.

"A" represents the cup or cell, and it is in the nature of the material constituting this cup that my invention primarily resides. The cup "A" I make of an absorbent, fibrous material and I impregnate the outer side of the fibre with a water and acid proof insulating compound, such as an asphaltum compound, or a petroleum compound, leaving the inner side absorbent.

"B" is the bottom of the cell, and may be made of fibre integral with the cup, or of fibre or metal and sprung into place so as to be water-tight or sealed and protected with an insulating compound "C", which insulating compound may be of wax, coal tar, petroleum compound, or any other well-known material, placed either above, below, or on both sides of the bottom "B".

"D" is the active element or electrolyte, which formerly consisted of a paste, of sal ammoniac, chloride of zinc; plaster, flour and water, but now usually consists of an absorbent material such as blotting paper, saturated with a solution of the electrolyte, such as sal ammoniac and chloride of zinc. The inner side D', Fig. 2, may constitute this absorbent material.

"E" is the depolarizing agent, usually peroxide of manganese.

"F" is the carbon or any other electronegative substance, and "G" is the zinc, or any other electro-positive substance.

"H" and "H'" are the binding posts connected to "F" and "G", and "I" is the insulated top or cover of the cell.

As both sides of the zinc "G" are exposed to the action of the electrolyte "D", a cell of my invention will have a much greater strength and life than an ordinary cell of the same size; or my cell will require only about one-half the weight of zinc of an ordinary cell of the same electrical capacity.

The fibre cup, being a poor conductor of heat, protects the cell as a whole from atmospheric changes, and insures its having a practically constant electrical value under all conditions of temperature.

Having now fully described my invention, what I claim as new and desire to secure by Letters Patent, is:—

1. A liquid tight battery cell or cup made of a fibrous material, saturated on its outer side only and to an appreciable depth with a non-absorbent insulating compound, the inner side being left absorbent.

2. A liquid tight battery cell or cup made of a fibrous material, saturated on its outer side and to an appreciable depth with a non-absorbent insulating compound and on its inner side with an electrolyte.

3. A dry battery consisting of an outer cell of a fibrous material saturated on its outer side with an insulating compound, the inner side being left absorbent an electro-positive element within the cell and surrounded with an electrolyte, an electro-negative element enclosed by the electro-positive element and covered by a depolarizing agent which is surrounded by the electrolyte.

4. A dry battery composed of an outer cell of a fibrous material, saturated on its outer side with an insulating compound and on its inner side with an electrolyte; an electropositive element enclosed by the cell and in contact with the electrolyte saturated inner side of the cell; an electro-negative element enclosed by the positive element and separated therefrom by a depolarizing agent.

5. A dry battery composed of an outer cell of a fibrous material, saturated on the outer side with an insulating compound and on the inner side with an electrolyte; an electro-positive element within the cell and in contact with electrolyte saturated inner side thereof; an electrolyte within and in contact with said electro-positive element; a depolarizing agent within said electrolyte and an electro-negative element within and covered by said depolarizing agent.

SAMUEL COCHRANE.

Witnesses:—
H. E. CUNNINGHAM,
GEO. R. FERGUSON.